United States Patent Office
3,518,784
Patented July 7, 1970

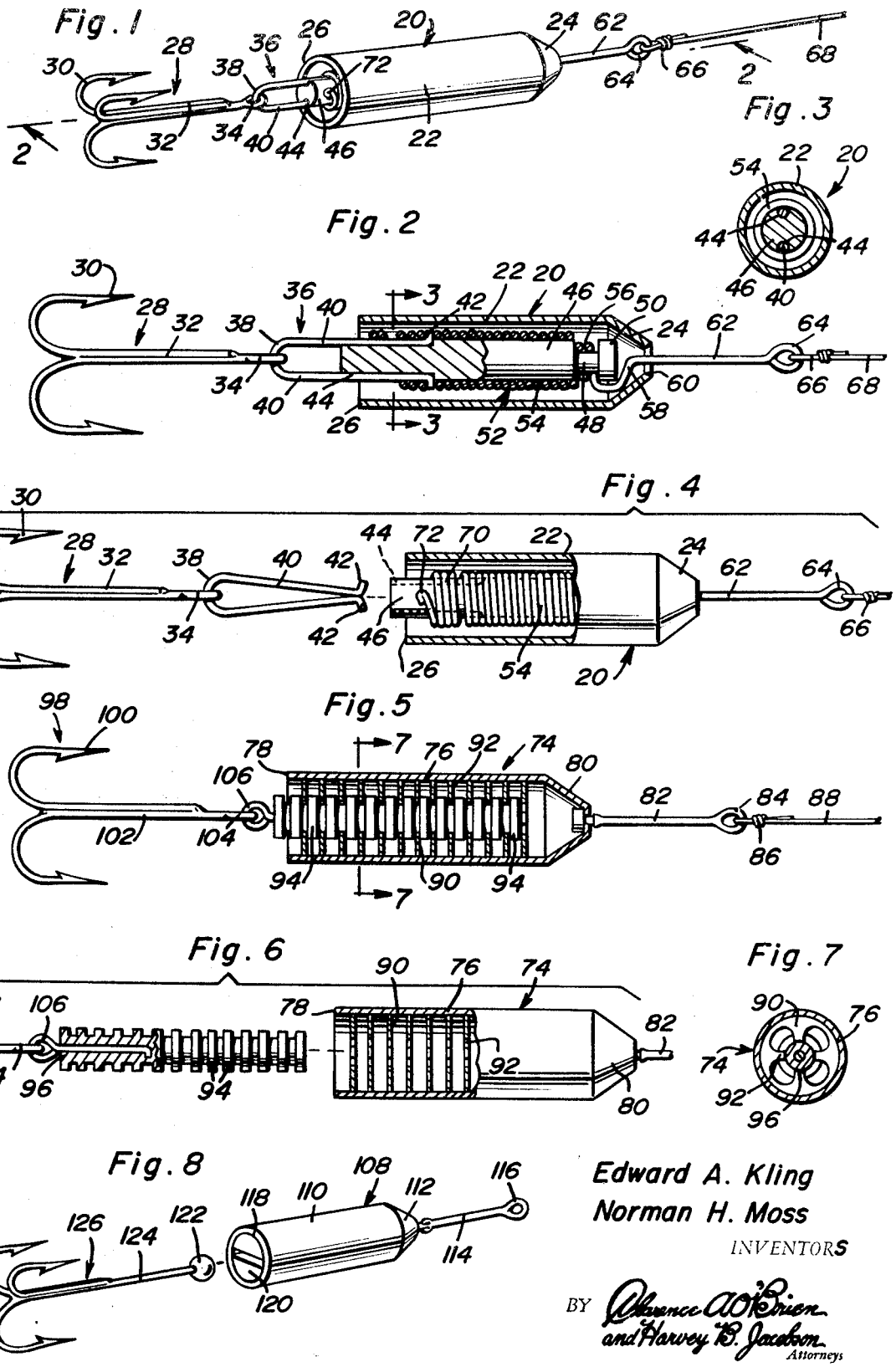

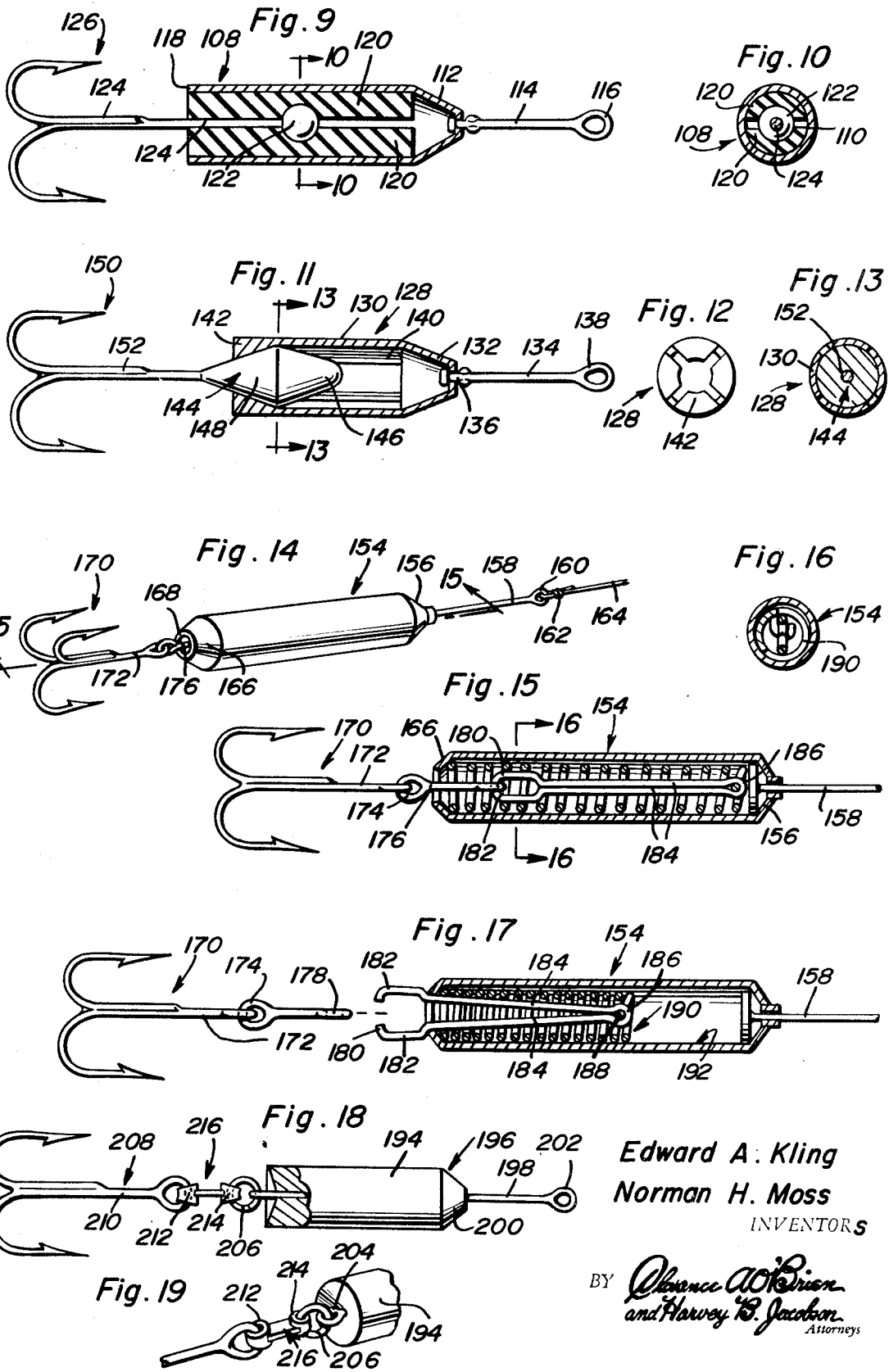

1

3,518,784
LURE WITH FISHHOOK RELEASING DEVICE
Edward A. Kling, 2279 Southwood St., and Norman H.
Moss, 2680 Bellevue Road, both of Muskegon, Mich.
49441
Filed July 1, 1968, Ser. No. 741,544
Int. Cl. A01k 91/04
U.S. Cl. 43—43.12
5 Claims

ABSTRACT OF THE DISCLOSURE

An artificial lure having an axial member at its leading end to which a fishing line is connected. Generically, the lure body, preferably an elongate shell, permits a conventional multiple-prong fishhook to be releaseably joined to its rearward end. Variable means, embodied in the six forms of the invention shown, is characterized by pull responsive means which allows the fishhook to release itself so that the angler can recover a snagged lure.

---

This invention relates to certain new and useful improvements, generally categorized as fishing tackle, and has to do, more specifically stated, with an artificial lure, a multiple prong fishhook, and novel means which functions to releasably join the fishhook to the cooperating rearward end of said lure.

More specifically, the invention herein disclosed is such in design and construction that it will allow a fisherman to satisfactorily retrieve and recover a snagged lure by merely applying pressure on his fishing line. The then retrieved lure can be readied for continuing use by attaching thereto a replacement hook. The fisherman will be allowed to change hooks at will and can use various sizes, color and accompanying streamers. Using the invention shown will enable the fisherman to check the line and set the drag on his reel before "wetting" his line.

As is known monofilament line will often have a weak spot if it has twisted under tension and has been drawn through a close loop. The improved lure will allow the fisherman to check his line at any time without losing equipment as might otherwise well be the case and check his line as to exact poundage.

Currently used artificial fishing lures may and often do have changeable hooks but no provision is made for satisfactorily and acceptably removing the same from a difficult-to-cope-with snag. By embodying an adaptation incorporating a release or break-away feature the lure can be used as any other lure until it is snagged. As will be hereinafter more fully appreciated when the lure is snagged the fisherman pulls on the line as he would with an ordinary lure that has become snagged but instead of breaking his line somewhere between the lure and the pull (leaving his lure, leader and sinkers and part of his line with the snag) the hook can be released and the lure can be readily reeled in.

As will be evident by glancing at the views of the drawings some six forms of the invention are involved and these will be taken up individually and in proper numerical sequence.

Stated briefly and construed generically the concept embodies a lure characterized by an elongated body which has a forward end and a rearward end. A shaft member or equivalent component part is connected with and projects axially beyond the forward end of the lure and is such in construction that it permits the angler to attach the trailing end of a regular fishing line thereto. The fishhook is more or less conventional in construction and is usually referred to herein as a multipleprong fishhook and it has a somewhat conventional type shank which varies at the forward end in one way or another.

2

Separable pull responsive means provides an operating connection between the forward end of the stated shank and a cooperating rearward end portion of the body of the lure. To the ends desired, the pull responsive means is structurally and functionally designed and adapted whereby separation and release of the hook is obtained when the hook is snagged on a rock or an obstruction and cannot be freed and also when the angler, when he is not fishing, decides at will to properly catch hold of and disconnect the fishhook so that it can be replaced with an alternate fishhook.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a lure with the fishhook releasing device constructed in accordance with the principles of the present invention and with the lure rigged for fishing use.

FIG. 2 is a central longitudinal sectional view with parts in section and elevation taken approximately on the plane of the section line 2—2 of FIG. 1 looking in the direction of the arrows.

FIG. 3 is a cross-section on the plane of the section line 3—3 of FIG. 2.

FIG. 4 is a view in side elevation on a slightly enlarged scale and which brings out the details of this particular embodiment of the invention and which, compared with FIGS. 1 and 2, shows the manner in which the fishhook linking means is separated from the retaining spring means.

FIG. 5 is a view in section and elevation showing a second form or modification of the invention rigged for use.

FIG. 6 is a view based on FIG. 5 and with parts in section and elevation and showing the connecting member for the hook (not detailed) in section and elevation and detached.

FIG. 7 is a cross-section taken on the plane of the section line 7—7 of FIG. 5.

FIG. 8 is a view in perspective showing a third form or modification of the invention with the hook detached.

FIG. 9 is a view based on FIG. 8 and showing the same form of the invention but with the headed hook assembled and ready for use.

FIG. 10 is a cross-section taken on the plane of the section line 10—10 of FIG. 9.

FIG. 11 is a view in section and elevation similar to FIG. 9 but showing a fourth modification of the invention.

FIG. 12 is an end view.

FIG. 13 is a cross-section taken on the plane of the section line 13—13 of FIG. 11.

FIG. 14 is a view in perspective showing the fifth form or modification of the invention and (like FIG. 1) rigged and readied for use.

FIG. 15 is a view on a slightly enlarged scale taken on the plane of the section line 15—15 of FIG. 14.

FIG. 16 is a cross-section taken on the plane of the section line 16—16 of FIG. 15.

FIG. 17 is a view which ties in with FIG. 15 and is provided to show how the coil spring is contracted, how the jaws of the link are projected and how the secondary link on the fishhook is capable of being detached and released.

FIG. 18 is a view in side elevation but with a portion shown in section and showing the sixth form or modification of the invention and wherein the break-away principle in construction slightly different from preceding forms of the invention.

FIG. 19 is a fragmentary perspective view showing this frangible type hook connecting and releasing means.

With reference first to FIG. 1 and the accompanying views, FIGS. 2 to 4 inclusive, it will be seen that the lure is an artificial type and is denoted by the numeral 20 and comprises an elongated cylindrical or equivalent hollow shell 22 which has a conical forward end 24 provided with a restricted opening as brought out perhaps best in FIG. 2. The rearward open end is denoted by numeral 26. The attachable and detachable fishhook is denoted at 28 and is a conventional triple prong hook wherein the barbed prongs are denoted at 30. The shank is denoted at 32 and is provided with an eye 34 at the forward end which serves to accommodate a substantially U-shaped resilient connecting link which is broadly referred to as linking or connecting means and is herein designated as a unit by the numeral 36. The bight portion 38 is connected with the eye 34. The limbs are denoted at 40 and have the inherent tendency to approach each other and swing together as shown at the left in FIG. 4. The free end portions of the spreadable limbs are denoted at 42. These limbs are adapted to be releasably seated in seating grooves 44 which are provided in diametrically opposite side of a core-like member 46 which is confined with the hollow portion of the shell. This member has a reduced neck 48 at the forward end terminating in a head 50. A coil spring 52 is provided and the primary coils 54 encircle the median and body portions of the member 46. Several more or less convolutions 56 encircle the neck and then the wire from which the coil spring is formed is bent as at 58 around the head and is extended through the apreture 60 to provide an attachment member 62 terminating in an eye 64 to which the end 66 of the fishing line 68 is connected. The coils 70 at the rearward end have a free terminal end portion 72 and the construction is such that these coils embrace the grooves and also coact with the lateral terminals 42 to in this manner separably join the link 36 with the lure. In case this construction should become snagged as is often the case, it will be evident that by exerting a pull on the line the convolutions 70 and 72 will function to release the link 36 thus permitting the hook 28 to be released and disengaged.

Referring now to the second embodiment or form of the invention the lure 74 comprises a hollow cylindrical shell or cylinder 76 having a rearward open end at the left as at 78 and a partially closed end at the front or forward end denoted at 80 with which an axially extending member 82 is connected and which terminates in an eye 84 to which an end 86 of the fishing line 88 is connected. The interior of the hollow portion of the cylinder or lure is provided at circumferentially spaced points with annular flanges 90 provided with resilient circumferentially spaced detents 92 releasably engageable with circumferentially spaced cooperating ribs 94 provided on the peripheral surface of an insertable and removable core-like insert or member 96. The detents 92 engaging the ribs 94 provides the desired pull responsive and separable connection between the lure and fishhook 98. Here again the fishhook embodies barbs 100 having a shank 102 terminating in an eye 104 which is connected with a companion or complemental eye 106 which provides an adapter and pivotal connection between the hook 98 and the core-like connector or insert 96. The manner in which the insert is fitted releasably in place is shown in FIG. 5 and the manner in which it can assume its released or disconnected position is shown in FIG. 6 at the left.

With respect now to the third form of the invention covered in FIGS. 8, 9 and 10 it will be noted that the lure is denoted at 108 and again comprises a hollow cylinder 110 whose forward substantially closed end is denoted at 112 and is provided with an axial member 114 with an eye 116 to which the fishing line (not shown) is connected. The rearward end portion here is denoted at 118 and the hollow portion of the cylinder or lure is provided with a pair of substantially semi-circular rubber or compressibly resilient inserts 120 which are spaced apart to accommodate a connecting and retaining ball-like head 122 on the shank 124 of the attachable and detachable as well as releasable multiple prong fishhook 126. The manner in which the hook is separated from the lure is shown in FIG. 8. The manner in which the parts are coupled together is shown in FIGS. 9 and 10 and this form of the invention is believed to be self-explanatory.

Referring now to the form of the invention, the fourth modification in FIGS. 11 to 13 it will be noted that the lure is denoted as a general unit by the numeral 128. Again it comprises a hollow cylinder 130 having a tapering substantially closed forward end 132 to which a suitable axial member 134 is appropriately connected at 136 and terminates in an eye 138 to accommodate the fishing line (not shown). In this form of the invention the hollow shell is provided with circumferentially spaced longitudinal slits 140 which are spreadable and which have shoulder-like terminal portions 142 to releasably hold the enlarged head 144 having forward and rearward conical component portions 146 and 148. Here again the multiple prong fishhook is denoted at 150 and has a shank 152 to which the head is connected. The manner in which the hook is separably and yieldingly connected to the lure is believed to be self-evident and no special detailed description is deemed to be necessary here.

In the fifth form or embodiment of the invention attention is directed to the showing thereof in FIGS. 14, 15, 16 and 17. The elongated hollow cylindrical shell which constitutes the lure is denoted by the numeral 154 and the forward right-hand end portion is substantially closed at 156 but centrally apertured to accommodate the coating end portion of a member 158 which like the corresponding and already described members is provided with an eye (shown only in FIG. 14) at 160. The end portion 162 of the line 164 is connected thereto. The centrally apertured rearward end portion is of truncated conical form as at 166 and the apertured portion is denoted at 168. In this adaptation the multiple prong hook is denoted at 170 and the shank at 172. It has an eye which is connectable to a coating eye 174 on an auxiliary or relatively short link 176 which in turn is provided with an eye 178 (FIG. 17) separably connectable with laterally directed jaw-like terminals 180 on the spreadable spring-biased end portions 182 on the free end portions of the openable and closable resilient limbs 184 which are connected at their forward ends by a bight portion 186 which in turn is connected with a cross member 188 at the right hand end portion of the expansible and contractible coil spring 190 (FIG. 17) confined in the hollow portion 192 of the shell 154. FIG. 15 shows the spring distended and substantially filling the hollow portion of the lure at which time the limbs 184 are contacted and the jaw-like and terminal portions 182 are pressed together within the confines of the coils of the spring. The short link 176 is partly drawn into the hollow portion of the shell with the hook attached in its normal ready-to-function position shown in FIGS. 14 and 15 in particular. When the contemplated pull is applied because of a snag by the angler holding the line 164 it will be evident that the coil spring is contracted as shown in FIG. 17 and the end portions 182 project through and beyond the rearward end portion 166 of the lure whereby to release the hook 170 and the short link 172 which is connected thereto.

Taking up now the final and sixth form or embodiment of the invention this is shown in FIGS. 18 and 19. It comprises instead of a hollow cylinder, an elongate wooden, plastic or equivalent part 194 which constitutes the lure. The lure is here designated generally by the numeral 196 and a shaft extends axially therethrough, One end portion 198 projects beyond the forward end 200 where it terminates in eye 202 to accommodate the fishing line. The eye on the other end of the rod is denoted at 204 and is provided with a split ring 206. The fishhook here is denoted at 208 and the shank 210 has its eye connected with a rearward eye 212 which is complemental to the eye 214. These eyes are connected together by a frangible connector 216. The eye 214 is connected to the aforementioned split ring 206 to complete the flexible as well as a releasable coupling or connection between the lure and fishhook. The procedure here is the same in that by holding the fishing line (not detailed) and exerting a pull thereon the snagged hook 208 will break-away to accomplish the same pull responsive and release result already set forth.

It will be evident that with the construction shown and described in the modifications covered (FIGS. 1-17) that the fishhook can be changed rapidly and easily. The line can be checked at a specific weight. Reel drag can be set to a specific weight. Better equipment can be used because of lowering the possible chance of loss. It will also allow the fisherman to present the lure as near as possible to a "covered hole" without fear of losing an expensive lure and leader.

It is submitted that the invention well serves the purposes for whch it is intended and more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an artifical lure embodying an elongated hollow shell having a forward end with a restricted axial opening therein and a rearward end which is substantially open, a coil spring confined in the hollow portion of said shell, a fishhook having a shank, and linking means providing an operating connection between said shank and coil spring and embodying a pair of elongated spreadable limbs having laterally directed free terminal ends, and, in combination, an elongated rigid core member operatively anchored in the hollow portion of said shell and having a headed neck at its forward end and dimetrically opposite keying grooves at its rearward end, said limbs being normally but removably seated in their respectively cooperable grooves and retained by said spring.

2. In combination, an artifical lure comprising an elongate hollow shell having a forward end provided with an axially aligned forwardly projecting fishline attaching member, an elongated rigid core operatively concentrically mounted in the hollow portion of said shell, said core being of a transverse cross-sectional dimension less than the cross-sectional dimension of the hollow portion of said shell with its peripheral surface spaced from the encompassing wall of said shell, a rearward end portion of said peripheral surface having a pair of diametrically opposite longitudinally extending grooves, a fishhook having a shank, linking means having a rearward end operatively connected to said shank and a pair of elongate spreadable resilient limbs removably seated in their respectively cooperable grooves, and a coil spring interposed between the shell and encircling the core and having free circumferentially expansible coils at a rearward end oriented with and releasably embracing coacting portions of said limbs.

3. The combination defined in and according to claim 2, and wherein said linking means comprises a substantially U-shaped resilient fishhook attaching and mounting link wherein the aforementioned limbs are connected at rearward ends by a rounded bight portion, the shank of said fishhook having a terminal eye pivotally operatively connected with said bight portion.

4. The combination defined in and according to claim 3, and wherein the inherent resilient properties are such that the limbs tend to spring toward each other, said limbs having laterally outwardly directed free terminal ends which are releasably cooperable with adjacent pull responsive coils of said spring in a manner that said link and fishhook can, when subjected to an abnormal pull, be freed from said shell.

5. The combination defined in and according to claim 4, and wherein the forward end of said core is provided with a reduced neck terminating in an enlarged head, said coil spring having certain of the forward coils reduced in diameter and wound around said neck.

References Cited

UNITED STATES PATENTS

| 2,627,692 | 2/1953 | Goodman | 43—43.12 |
| 2,775,057 | 12/1956 | Ludgate | 43—43.12 |
| 2,869,278 | 1/1959 | Cook | 43—44.86 X |
| 3,091,885 | 6/1963 | Ulsh | 43—43.12 X |

FOREIGN PATENTS

| 687,010 | 2/1953 | Great Britain. |

WARNER H. CAMP, Primary Examiner

U.S. Cl. X.R.

43—42.72, 44.83